United States Patent [19]  
Huddle et al.

[11] 4,409,868  
[45] Oct. 18, 1983

[54] THREADING TOOL AND METHOD

[75] Inventors: David R. Huddle, Windsor, Canada; Robert L. Coleman, Berkley, Mich.

[73] Assignee: The Valeron Corporation, Troy, Mich.

[21] Appl. No.: 476,638

[22] Filed: Mar. 23, 1983

Related U.S. Application Data

[63] Continuation-in-part of Ser. No. 253,700, Apr. 13, 1981, abandoned.

[51] Int. Cl.³ ............................................. B23P 15/48
[52] U.S. Cl. ......................................... 82/1 C; 407/67; 407/69; 408/222; 408/59; 408/60
[58] Field of Search .............. 407/67, 68, 69, 70; 408/215, 216, 217, 218, 219, 220, 221, 222, 223, 224, 188, 713, 57, 59, 60, 58, 61; 82/1 C

[56] References Cited

U.S. PATENT DOCUMENTS

| 1,410,451 | 3/1922 | Bullard et al. | 407/67 |
| 1,428,075 | 9/1922 | Breckenridge | 407/69 |
| 2,669,149 | 2/1954 | Watson et al. | 82/37 |
| 2,744,269 | 5/1956 | Kerr et al. | 408/80 |
| 2,789,641 | 4/1957 | Solenberger | 407/70 |
| 2,861,322 | 11/1958 | Benes et al. | 407/71 |
| 2,954,570 | 10/1960 | Couch | 407/70 |
| 3,018,675 | 1/1962 | Klages et al. | 407/69 |
| 3,180,006 | 5/1965 | Emmons | 407/70 |
| 3,364,800 | 1/1968 | Benjamin et al. | 408/59 |
| 3,371,567 | 3/1968 | Davis | 82/36 R |
| 3,455,002 | 7/1969 | Miller | 407/70 |
| 3,466,721 | 9/1969 | Binns | 407/70 |
| 3,511,120 | 5/1970 | Kaser | 408/59 |
| 3,780,409 | 12/1973 | Bartoszevicz | 407/71 |
| 4,072,438 | 2/1978 | Powers | 408/59 |
| 4,123,194 | 10/1978 | Cave | 408/221 |
| 4,189,264 | 2/1980 | Kraemer | 407/101 |
| 4,213,354 | 7/1980 | Dahinden | 408/61 |
| 4,233,867 | 11/1980 | Zimmerman | 407/113 |
| 4,252,038 | 2/1981 | Subramanian et al. | 407/100 |
| 4,278,373 | 7/1981 | Wolfe | 408/188 |
| 4,281,430 | 8/1981 | Hellnick | 408/188 |
| 4,355,932 | 10/1982 | Koppelmann et al. | 408/188 |

FOREIGN PATENT DOCUMENTS

| 2848230 | 5/1980 | Fed. Rep. of Germany | 407/69 |
| 2921106 | 12/1980 | Fed. Rep. of Germany | 407/70 |
| 276352 | of 1951 | France | 408/59 |
| 570225 | of 1975 | Switzerland | 407/68 |

Primary Examiner—Robert E. Garrett  
Assistant Examiner—Jerry Kearns  
Attorney, Agent, or Firm—Gordon K. Harris, Jr.

[57] ABSTRACT

A threading tool is disclosed featuring the combined utilization of a multi-toothed thread chaser insert with a single point indexable thread chaser insert. In generating a desired thread form, successive teeth of the multi-toothed chaser perform the initial cutting passes on a workpiece, while the tooth of the single tooth chaser performs the final finishing cutting operation.

16 Claims, 6 Drawing Figures

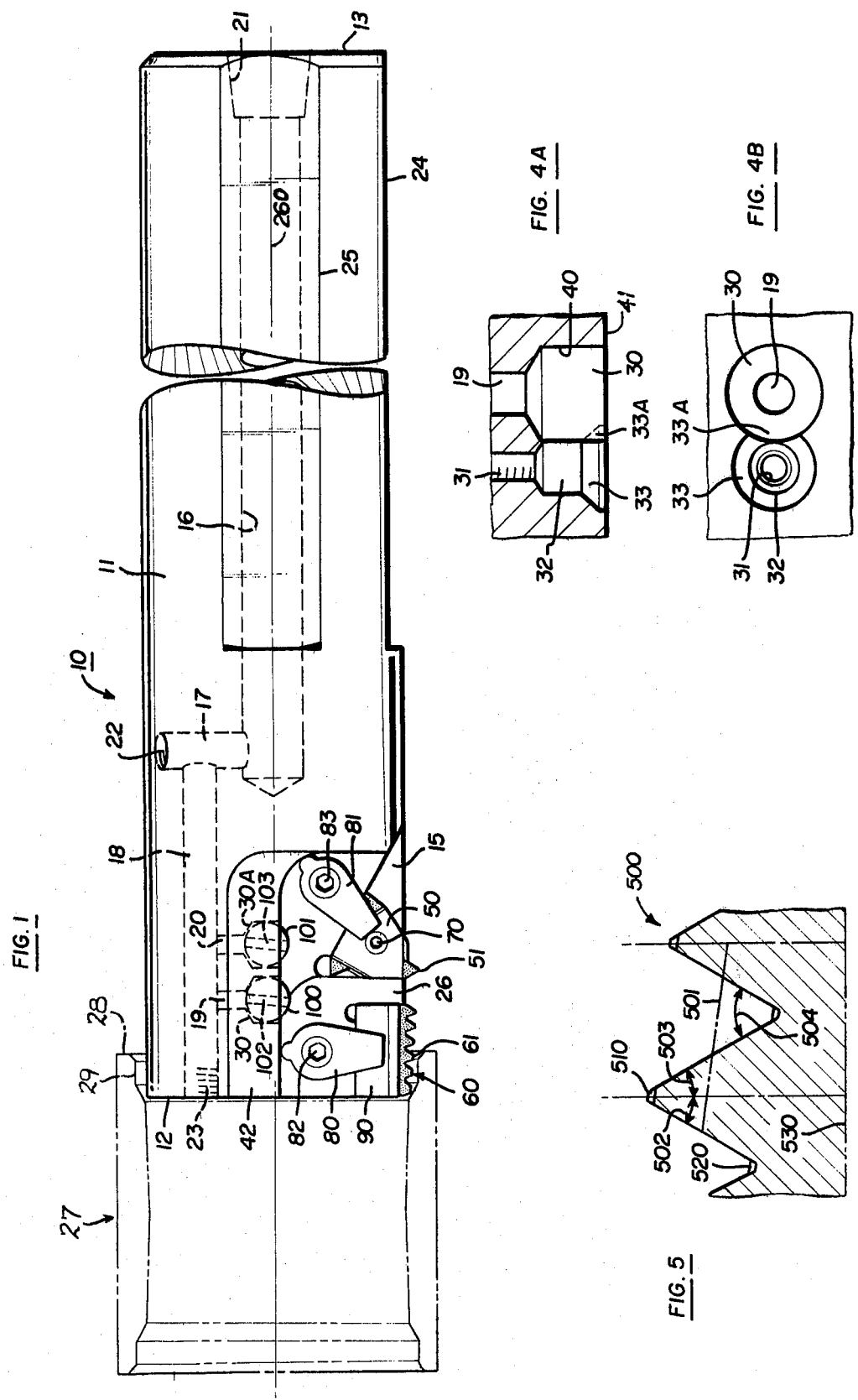

THREADING TOOL AND METHOD

This application is a continuation-in-part of Ser. No. 6/253,700, filed Apr. 13, 1981, assigned to the same assignee, and now abandoned.

BACKGROUND OF THE INVENTION

1. Field of the Invention

This invention relates generally to cutting tools. More specifically, the invention concerns apparatus and a method for forming threads in a workpiece.

2. Description of the Prior Art

Conventional thread generation on workpiece surfaces, interior or external, is performed in one of two ways. In a first prior art approach, a single point cutting cutting element, or thread chaser insert, is used by performing multiple cuts on the workpiece surface with successive passes of the same single cutting tooth, each pass taking a deeper cut than the previous pass. Such an approach is time consuming and complicated by the necessity for accurately repositioning the cutting point with respect to the workpiece prior to each cutting pass.

A second prior art approach makes use of one or more multi-toothed cutting elements or thread chaser inserts, with each tooth of each such insert positioned to take a deeper cut than a preceding tooth. Hence, the time required for generating the same thread form is substantially reduced from that time required when using a single point thread chaser. However, for more complex thread forms having relatively tight tolerance requirements, the last, or deepest, cutting tooth on the multi-tooth chaser frequently is prone to fracture due to its required shape. Such damage, in turn, necessitates scrapping the entire expensive multi-tooth chaser, even though only a single cutting tooth thereof has been damaged.

The instant invention is directed to overcoming the disadvantages of both the above prior approaches by a novel combination approach utilizing the advantages offered by both old arrangements. The most pertinent prior art known to applicants is disclosed in U.S. Pat. No. 2,954,570—Couch, wherein a thread chaser tool includes means for releasably mounting a plurality of single point thread cutting tools in abutting, side by side relationship, and means for securing the various cutting tools in adjusted position relative to the workpiece. This prior art approach does overcome the disadvantage of having to replace an entire multi-toothed element whenever one tooth fractures. However, by using a separate single point element for every tooth of the threading tool, the Couch arrangement involves a great deal of required set-up time, and the holder is relatively expensive to produce, because of the plurality of threaded cutting element mounting bores and associated mounting hardware involved.

SUMMARY OF THE INVENTION

It is an object of this invention to provide an apparatus and method for generating thread forms in a manner avoiding the above problems of the prior art.

Accordingly, an apparatus and method for threading a surface of the workpiece is disclosed wherein a multi-toothed thread chaser insert is mounted on the same toolholder with a single-toothed thread chaser. The cutting teeth of the multi-toothed chaser perform the initial cutting passes on the workpiece surface, while the cutting tooth of the single-toothed chaser makes the final finishing cut of the thread forming process.

It is a feature of this invention that conventional thread chaser inserts of two different types may be simultaneously used in the same toolholder, including a single toothed type insert that is indexable to a plurality of positions, each position presenting a different cutting tooth for operative engagement with a workpiece.

DRAWING

The objects and features of the invention will become apparent upon a reading of a detailed description of an illustrative embodiment taken in conjunction with the drawing in which:

FIG. 1 is a plan view of a threading tool taken normal to the axis of the tool body with a workpiece to be threaded shown in phantom outline form;

FIGS. 4A and 4B are sectional views of coolant outlet passageways used in the tool body of FIG. 1;

FIG. 5 is a graphical illustration of a typical pipe thread form capable of being generated by a tool arranged and used in accordance with the principles of the invention.

DETAILED DESCRIPTION

Figure 3:
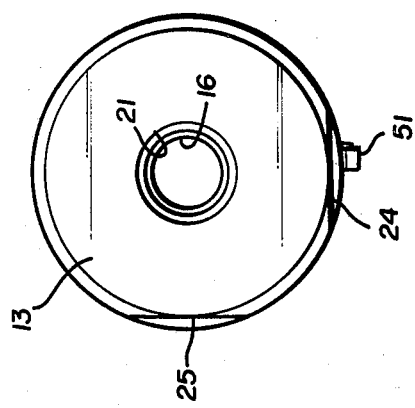
FIG. 3 is another axial view taken from the mounting end of the toolholder of FIG. 1.

The same reference numerals are used for the same component or portion of the apparatus depicted in the various figures.

Figure 2:
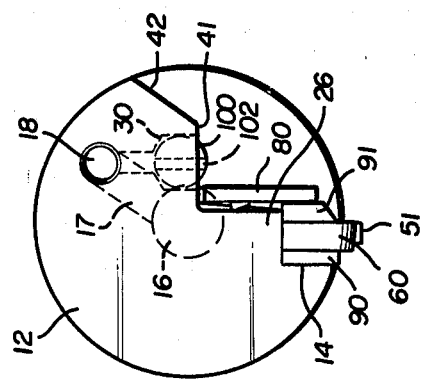
FIG. 2 is a view taken along the axis of the tool of FIG. 1 from a cutting end of the tool body.

With reference to FIGS. 1-3, an elongate toolholder bar 10 is shown, having substantially circular cross section about axis 260 and having a cutting end 12 and a mounting end 13 joined by an axially extending shank portion 11. Shank portion 11 is provided with two locating flats 24, 25 for proper seating of the bar in a suitable mounting device (not shown).

Formed at a lateral periphery of the toolholder adjacent cutting end 12 is a first cutting element locating and mounting pocket 14 adapted to receive a shim seat 90, upon which, in turn, is placed in multiple-toothed thread chaser insert 60. On top of chaser 60 is placed a chipbreaker 91, in turn engaged by a top clamp 80 secured to the toolholder body by a clamp screw 82.

Axially rearward and in substantial alignment with pocket 14 is a second cutting element locating and mounting pocket 15 separated from pocket 14 by a shoulder portion 26 of toolholder body material. Pocket 15 is adapted for receipt of indexable single-toothed thread chaser insert 50, which is held in operative cutting position via both a locking screw 70 passing through a central aperture of the insert and threadingly engaged with a bore (not shown) in the toolholder body and a top clamp 81 secured to the toolholder body by clamp screw 83.

Toolholder bar 10 additionally includes a hollow bore or passageway 16 extending through the holder body substantially parallel to axis 260 from an opening 21 at mounting end 13 which is suitably threaded for coupling to a source of coolant (not shown). Adjacent the closed end of passageway 16 is a substantially radially extending passageway 17, communicating with passageway 16 at its radially innermost end and terminating at the outer lateral surface of body 10 at sealing plug 22.

Passageway 17 further communicates with passageway 18 extending substantially parallel to axis 260 up to body cutting end 12 where passageway 18 is sealed by plug 23.

Communicating with passageway 18 are a pair of substantially radially extending coolant passageways 19 and 20, having respectively enlarged portions shaped for receipt of respective spherically shaped balls 100 and 101, which passageways open at body wall surface 41 just under relieved body surface 42 at positions generally above and radially inward from respective mounting pockets 14 and 15. Ball 100 is provided with diametrical bore 102, while ball 101 is provided with diametrical bore 103, each ball being retained in a corresponding passageway with its associated diametrical bore positioned such that coolant may be directed in preselected directions relative to the respective cutting teeth of cutting inserts 50 and 60. Balls 100 and 101 are retained in their respective bores in a manner to be discussed in a later portion of this specification in conjunction with FIGS. 4A and 4B.

To illustrate the general method of use of the tool of FIG. 1, a blank or workpiece 27 to be internally threaded is shown in phantom outline in FIG. 1. Blank 27 has a longitudinal axis parallel to axis 260 of toolholder 10 when blank 27 is positioned for operative engagement with toolholder 10. Relative rotation and axial feed between holder 10 and blank 27 is conventionally provided by means not shown in FIG. 1 such that the internal bore of blank 27 may be threaded starting at coupling recess 29 and extending axially along the blank from coupling face 28 for a preselected distance. As seen from FIG. 1, the cutting teeth of thread chaser 60 are formed such that successive teeth take a deeper cut as axial feed of the toolholder with respect to the workpiece takes place. The active cutting tooth 51 of insert 50 takes the deepest and finishing cut of the thread form being generated.

The specific embodiment set forth in FIGS. 1-3 is of a threading tool for generating internal threads on the blank or workpiece 27 shown in phantom outline in FIG. 1. It should be noted that internal threading is shown for the sake of example and without intended limitation to the instant invention. External threading operations can be performed with the same type of tooling featuring the combined use of single and multi-toothed thread chaser inserts.

Referring now to FIGS. 4A and 4B, the mounting arrangement for the adjustable coolant outlets of the tool of FIG. 1 is set forth in more detail. The details of FIG. 4A and 4B refer to the mounting arrangement for ball 100. It should be noted that an identical arrangement is provided also for ball 101. As seen in FIGS. 4A and 4B, radially extending passageway 19 includes an enlarged portion 30 opening at wall 41 of toolholder 10. The diameter of enlarged portion 30 is chosen to be just slightly larger than the diameter of spherically shaped ball 100, such that ball 100 may be removably mounted in portion 30. Substantially parallel to passageway 19 is a threaded bore 31 with an enlarged region 32 shaped for receipt of an appropriately shaped screw (not shown). Region 32 includes a conical countersunk region 33 for receipt of a conically shaped portion of such a screw, and further includes region 33A which intersects portion 30 of passageway 19. Hence it will be seen that when ball 100 is placed in portion 30 and a suitably shaped screw is threaded into bore 31, a conical surface of the screw will bear against the surface of ball 100 thereby retaining same in a preselected position. The diametrical passageway 102 of ball 100 can therefore be oriented at a desired angle to the axis of passageway 19 to direct coolant in an adjustable range of directions.

The disclosed apparatus and method of this invention are useful in generating even complicated thread forms. One such form is shown in FIG. 5 and corresponds to a standard line-pipe thread form, the dimensional details of which can be found in American Petroleum Institute (API) Standard 5B. In the line pipe thread form of FIG. 5, thread form 500 has a taper on the order of ¾ inches per foot, a clearance flat, such as flat 510, at the crest of each thread and a flat, such as flat 520, at the root of each thread. The axis of thread form 500 is shown as 530, the angles 502 and 503 are each on the order of 30 degrees, and the pitch line is designated 501. As seen from such a thread form, the narrow roots require a finishing cutting tooth of relatively narrow, closely toleranced dimensions. Such a cutter tooth is provided in the instant invention by cutting 51 (FIG. 1) of single tooth chaser insert 50. Such a tooth is, due to its shape, more susceptible to fracture than the preceding cutting teeth of chaser 60. Hence insert 50 is chosen to be an indexable, relatively inexpensive, single tooth chaser insert.

Figure 6:
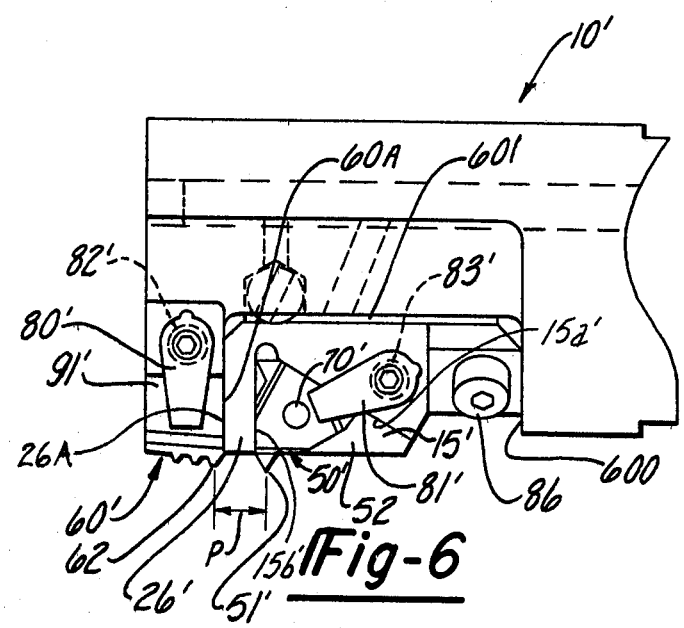
FIG. 6 is a plan view taken normal to the axis of an alternative embodiment.
Figure 7:
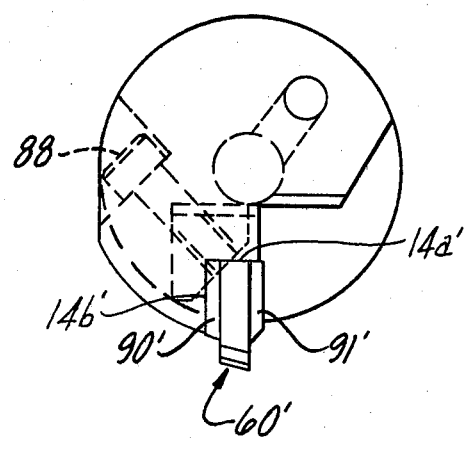
FIG. 7 is a view taken along the axis of the tool of FIG. 6 from a cutting end of the tool body.

With reference to FIGS. 6 and 7, the invention additionally contemplates use of an alternative mounting arrangement for the finishing tooth utilizing an adjustable cartridge. As will be seen from the following description, the use of a cartridge for holding the indexable single point finishing tooth enables easier adjustment of the axial location of the finish tooth to within acceptable tolerance limits.

The cutting end of elongate toolholder bar 10' of FIGS. 6 and 7 has a multiple-toothed thread chaser insert 60' mounted between a shim seat 90' and a chipbreaker 91' which is, in turn engaged by a top clamp 90' secured to the toolholder body by a clamp screw 82'. A suitable first locating and mounting pocket in toolholder bar 10' comprises substantially perpendicular surfaces 14a' and 14b' (FIG. 7) and is shaped for substantially mating receipt of the sandwiched combination of shim seat 90', chaser 60' and chipbreaker 91'.

Axially rearward and in substantial alignment with the first locating and mounting pocket is a second locating and mounting pocket 600 shaped for receipt of a removable cartridge 52 and sizing plate 601. Cartridge 52 is mounted to toolholder body 10' by two screws 86 and 88 and provides a mounting and locking cavity comprised of substantially mutually perpendicular surfaces 15', 15a' and 15b' for receipt of indexable single-toothed thread chasing insert 50', which is held in operative cutting position via both a locking screw 70' passing through a central aperture of the insert and threadingly engaging a bore (not shown) in the cartridge body 52 and a top clamp 81' secured to the cartridge body 52 by clamp screw 83'.

As seen from FIG. 6, an axially leading surface 26A of shoulder portion 26 of cartridge 52 abuts an axially trailing surface 60A of multi-toothed chaser insert 60'. Hence by suitable grinding of the surface 26A of cartridge shoulder 26' prior to mounting the cartridge to toolholder body 10', the axial spacing P between the final tooth 62 of chaser 60' and the finishing tooth 51' of insert 50' can be very accurately determined. It will be apparent to those skilled in the art that spacing P must be extremely close to an integral multiple of the pitch of the thread form to be generated. Use of the embodiment of FIGS. 6 and 7 incorporating a cartridge therefore eliminates the necessity of achieving spacing P to within tolerance by accurately machining the finishing single tooth insert pocket into the toolholder body itself.

An additional adjustment is provided by grindable sizing plate 601 to thereby accurately locate the radial extent of finishing tooth 51'.

The invention has been described with reference to preferred embodiments, the details of which are for the sake of example only. The scope of the invention is to be limited solely by the appended claims.

What is claimed is:

1. A cutting tool comprising:
   toolholder means having a first cutting element mounting pocket formed at a peripheral surface of the toolholder means at one end thereof, and a second cutting element mounting pocket axially spaced rearwardly from the first pocket;
   a multi-toothed thread chaser insert positioned in the first pocket so as to present a plurality of cutting teeth extending beyond the peripheral surface transversely to a longitudinal axis of the toolholder means;
   a single tooth thread chaser insert having a finishing cutting tooth of a width narrower than the widths of the cutting teeth of the multi-toothed thread chaser insert, the single toothed thread chaser positioned in the second pocket so as to present the single finishing cutting tooth extending beyond the peripheral surface transversely to the longitudinal axis to an extent further than any of the teeth of the multi-toothed thread chaser insert; and
   means for clamping the multi-toothed thread chaser insert and the single toothed thread chaser insert in their respective mounting pockets.

2. A cutting tool as set forth in claim 1 wherein the single toothed thread chaser insert is indexable to a plurality of cutting positions, each position presenting a different single finishing tooth cutting surface.

3. A cutting tool as set forth in claim 1, wherein the multi-toothed chaser cutting teeth are mounted in axial alignment forwardly of the single-toothed chaser finishing cutting tooth in a direction of cutting tool feed relative to a workpiece.

4. A cutting tool as set forth in claim 1 further comprising:
   a coolant passageway extending substantially parallel to the axis of the toolholder means;
   first and second coolant passageways extending substantially transversely to the axis of the toolholder means and coupled to the axially extending passageway, the first and second passageways terminating at a peripheral surface of the toolholder means at first and second openings respectively positioned above the first and second mounting pockets; and
   means for coupling the axially extending passageway to a source of coolant.

5. A cutting tool as set forth in claim 5 further comprising:
   substantially spherically shaped means removably disposed in a portion of each of said first and second passageways, each spherically shaped means including a passageway extending along a diameter of the spherically shaped means; and
   means for retaining the spherically shaped means with its diametrically extending passageway in a preselected position relative to an axis of the corresponding transversely extending passageway.

6. A cutting tool as set forth in claim 6 wherein the means for retaining comprises:
   a threaded bore having an axis substantially parallel to the axis of the corresponding transversely extending passageway and having a countersunk portion intersecting the radial passageway at the portion where the spherically shaped means is removably disposed; and
   screw means having a tapered surface positioned for retentive engagement with the spherically shaped means when the screw means is threaded into the bore.

7. A cutting tool as set forth in claim 4 further comprising:
   a shim seat positioned between a bottom surface of the multi-toothed chaser and a bottom surface of the first mounting pocket.

8. A cutting tool as set forth in claim 8 further comprising:
   a chipbreaker mounted between a top surface of the multi-toothed chaser and the means for clamping same.

9. A method for generating a thread from of predetermined pitch on a workpiece comprising:
   mounting a multi-toothed thread chaser insert to a lateral surface at an end of a toolholder,
   mounting a single toothed thread chaser on the same toolholder axially spaced rearwardly with respect to the toolholder end from the teeth of the multi-toothed chaser insert a distance substantially equal to the pitch multiplied by an integer, the single tooth having a width narrower than the width of any of the teeth of the multi-toothed chaser insert and with the single tooth positioned to take a cut deeper than any of the teeth of the multi-toothed chaser; and
   feeding the workpiece relative to the toolholder such that the thread form is initially cut by successive teeth of the multi-toothed chaser insert and finish cut by the single-toothed chaser.

10. A toolholder comprising:
    a body having a shank portion;
    a first locating and mounting means having at least two substantially perpendicular surfaces at a peripheral surface of the shank portion adjacent one end thereof, the substantially perpendicular surfaces shaped for receipt of a substantially rectangular multi-toothed thread chaser insert with teeth which will extend beyond the peripheral surface; and
    second locating and mounting means axially spaced along the shank rearwardly of and in substantial axial alignment with the first locating and mounting means, the second locating and mounting means including a pocket having substantially mutually perpendicular surfaces shaped for receipt of a cutting element presenting a single thread chasing finishing tooth which will extend beyond the peripheral surface to an extent further than any of the teeth of the multi-toothed insert, and a shoulder portion lying between the pocket and the first locating and mounting means and having a surface adjacent the first locating and mounting means engaging one edge of the multi-toothed insert, the width of the shoulder portion determining the distance between a last cutting tooth of the multi-toothed insert and the finishing tooth.

11. A toolholder as set forth in claim 10, wherein the pocket of the second locating and mounting means has its mutually perpendicular surfaces shaped for receipt of a substantially polygonal single toothed thread chaser insert indexable to a plurality of cutting positions.

12. A toolholder as set forth in claim 10 wherein the second locating and mounting means comprises a cartridge removably coupled to the shank portion, the cartridge including said pocket and having at one end thereof said shoulder portion.

13. A toolholder as set forth in claim 12 further comprising a replaceable sizing element positioned between the cartridge and the shank portion so as to determine the distance the finishing tooth will extend beyond the peripheral surface.

14. A toolholder as set forth in claim 12 wherein the pocket is formed by three mutually perpendicular walls shaped for receipt of a triangular indexable insert presenting the finishing tooth, one of the walls comprising a boundary of the shoulder portion.

15. A cutting tool as set forth in claim 1 further comprising a cartridge removably coupled to the peripheral surface rearwardly of the first cutting element mounting pocket and having formed therein the second cutting element mounting pocket.

16. A cutting tool as set forth in claim 15 further comprising a replaceable sizing element postioned between the cartridge and the peripheral surface so as to determine the distance the finishing cutting tooth extends beyond the peripheral surface.

* * * * *

UNITED STATES PATENT AND TRADEMARK OFFICE
CERTIFICATE OF CORRECTION

PATENT NO. :   4,409,868

DATED      :   October 18, 1983

INVENTOR(S) :  David R. Huddle, Robert L. Coleman

It is certified that error appears in the above-identified patent and that said Letters Patent is hereby corrected as shown below:

Column 5, line 62, "claim 5" should read -- claim 4--. Column 6, line 5, "claim 6" should read --claim 5--. Column 6, line 17, "claim 4" should read -- claim 3 --. Column 6, line 22, "claim 8" should read -- claim 7 --.

Signed and Sealed this

Nineteenth Day of June 1984

[SEAL]

*Attest:*

GERALD J. MOSSINGHOFF

*Attesting Officer*          *Commissioner of Patents and Trademarks*